US007389274B2

(12) United States Patent
Sansone et al.

(10) Patent No.: US 7,389,274 B2
(45) Date of Patent: Jun. 17, 2008

(54) INTEGRATED PAYMENT FOR INTERNATIONAL BUSINESS REPLY MAIL

(75) Inventors: Ronald P. Sansone, Weston, CT (US); Erik Monsen, Shelton, CT (US); Douglas B. Quine, Bethel, CT (US)

(73) Assignee: Pitney Bowes Inc., Stamford, CT (US)

( * ) Notice: Subject to any disclaimer, the term of this patent is extended or adjusted under 35 U.S.C. 154(b) by 720 days.

(21) Appl. No.: 10/674,133

(22) Filed: Sep. 29, 2003

(65) Prior Publication Data

US 2005/0071288 A1 Mar. 31, 2005

(51) Int. Cl.
*H04L 29/00* (2006.01)
*G07B 17/00* (2006.01)

(52) U.S. Cl. ........................................ 705/60; 705/401

(58) Field of Classification Search ................. 705/400
See application file for complete search history.

(56) References Cited

U.S. PATENT DOCUMENTS

| | | | | |
|---|---|---|---|---|
| 4,999,481 | A * | 3/1991 | Baer et al. | 235/375 |
| 5,459,670 | A | 10/1995 | Johnson et al. | |
| 5,554,842 | A * | 9/1996 | Connell et al. | 235/491 |
| 5,612,889 | A | 3/1997 | Pintsov et al. | |
| 5,978,781 | A | 11/1999 | Sansone | |
| 6,130,613 | A | 10/2000 | Eberhardt et al. | |
| 6,430,543 | B1 * | 8/2002 | Lee et al. | 705/60 |
| 6,526,393 | B1 * | 2/2003 | Fredman | 705/408 |
| 6,701,304 | B2 | 3/2004 | Leon | |
| 6,741,178 | B1 | 5/2004 | Tuttle | |
| 6,865,558 | B1 | 3/2005 | Pierce et al. | 705/60 |
| 6,978,248 | B1 * | 12/2005 | Walker et al. | 705/10 |
| 7,058,581 | B1 * | 6/2006 | Young | 705/1 |
| 7,120,610 | B1 | 10/2006 | Brookner et al. | 705/401 |
| 2002/0073040 | A1 * | 6/2002 | Schwartz et al. | 705/62 |
| 2003/0009351 | A1 | 1/2003 | Wade | 705/1 |

(Continued)

FOREIGN PATENT DOCUMENTS

| | | | |
|---|---|---|---|
| EP | 1 022 065 | | 7/2000 |
| EP | 1 313 068 | | 5/2003 |
| WO | WO 02/061999 | * | 8/2002 |

OTHER PUBLICATIONS

FedEx,http://web.archive.org/web/20020611074601/ http://www.fedex.com/us/about/corporation.*

(Continued)

*Primary Examiner*—John W Hayes
*Assistant Examiner*—Eric Liou
(74) *Attorney, Agent, or Firm*—Ronald Reichman; Angelo N. Chaclas

(57) ABSTRACT

The invention makes it easier for the post office to calculate accurately terminal dues for business reply mail by providing information to the post regarding each piece of business reply mail that crosses an international border. The foregoing is accomplished by charging a sender's meter for business reply mail that is being deposited with a first carrier; transmitting the funds charged to the meter to a meter data center; transmitting from the meter data center to a first carrier meter payment center the funds attributable to the first and second carriers; and transmitting from the first meter payment data center to the second meter payment data center the funds attributable to the second carrier.

16 Claims, 8 Drawing Sheets

U.S. PATENT DOCUMENTS

| | | | | |
|---|---|---|---|---|
| 2003/0014375 | A1 | 1/2003 | Hoffmann et al. | |
| 2003/0093389 | A1* | 5/2003 | Critelli et al. | 705/402 |
| 2003/0105704 | A1 | 6/2003 | Sundel | |
| 2003/0115162 | A1 | 6/2003 | Konick | 705/404 |
| 2004/0012486 | A1 | 1/2004 | De Souza et al. | |
| 2004/0064422 | A1* | 4/2004 | Leon | 705/401 |
| 2004/0215480 | A1 | 10/2004 | Kadaba | 705/1 |

OTHER PUBLICATIONS

Unknown Author, "Services available from the U.S. Postal Service", Profit-Building Strategies for Business Owners, Mar. 1989, vol. 19, No. 3, p. 8.*

* cited by examiner

INTEGRATED PAYMENT FOR INTERNATIONAL BUSINESS REPLY MAIL

CROSS REFERENCE TO RELATED APPLICATIONS

Reference is made to commonly assigned copending patent application Ser. No. 10/674,135 filed herewith entitled "Method For Postage Evidencing For The Payment Of Terminal Dues" in the names of Erik Monsen, Ian A. Siveyer, Marc Morelli, Yakup J. Igval, John C. Harmon and Ronald P. Sansone; Ser. No. 10/674,134 filed herewith entitled "Method For Postage Evidencing With Cross-Border Mail Tracking Capability and Near Real Time for Terminal Dues Reconciliation" in the names of Ronald P. Sansone and Erik Monsen; and Ser. No. 10/673,794 filed herewith entitled "Method For Postage Evidencing For The Payment Of Terminal Dues Using Radio Frequency Identification Tags" in the names of Ronald P. Sansone and Erik Monsen.

FIELD OF THE INVENTION

The invention relates generally to the field of mailing systems and, more particularly, to methods for paying for international business reply mail.

BACKGROUND OF THE INVENTION

The Universal Postal Union has a complex system that administers contracts between member post offices relating to terminal dues paid between and among different post offices. Terminal dues are the payments made between national postal administrations to cover the costs of handling and delivering international mail. Rates are established by the Universal Postal Union, and through bilateral and multilateral agreements. Typically, a post office will charge another post office for the delivery of mail to a recipient within its jurisdiction. For instance, if mail is sent from the United States to the United Kingdom, the United States post office will deliver the mail to the Royal Mail, and the Royal Mail will deliver the mail to the recipient. At the end of a predetermined time, the United States post office and the Royal Mail will tabulate, by weight, all of the mail each post office delivered for the other post office and calculate how much money one post office owes to the other post office.

Business mailers prepare and process various types of business mail utilizing inserters to collate the sheets and stuff the same into envelopes. Invoices, advertisements for the purchase of goods and/or services, prepaid post cards as well as business reply, i.e., business reply envelopes, business reply cards. Business reply sometimes is placed in outer envelopes mailed by business mailers to customers. Recipients of business mailers' mail may enclose a check and invoice and/or an advertisement order form in the business reply mail and mail it via the United States Postal Service (USPS) to the business mailer. Business mailer recipient customers may also mail the enclosed business reply card back to the business mailer.

The USPS allows a business mailer to receive first class business reply permit mail from their customers and pay postage and a fee only for the mail returned to the mailer from the original distribution of the mailing. Postage and fees are collected when the mailer picks up the permit business reply mail at their local USPS office.

One of the disadvantages of the above procedure is that it does not accurately determine the services performed by each post office.

An additional disadvantage of the prior art is that a postage meter could not be used for the payment of international business reply mail.

SUMMARY OF THE INVENTION

This invention overcomes the disadvantages of the prior art by making it easier for various post offices to calculate and collect accurately terminal dues by providing information to each post office regarding each piece or parcel of mail that crosses an international border. The invention also permits the post offices to calculate terminal dues for international business reply mail by utilizing a postage meter and a data center.

The foregoing may be accomplished by having a mail piece mailed in the United States containing a metered business return mail piece insert that is delivered to a destination in the United Kingdom, where the mailer's postage meter will place a USPS postal indicia on the mail piece for that portion of the delivery cost that is attributable to the United States post office and a Royal Mail replica postal indicia on the mail piece for that portion of the delivery cost that is attributable to the Royal Mail. The mail piece will also contain an indication on the front of the mail piece that the mail piece contains a business reply mail piece. The mailer's postage meter will also notify a data center located in the United States that the mail piece has been metered for the correct international mail values for mail being deposited in the United States and delivered in the United Kingdom. As the mail approaches the United States border, the face of the mail is scanned and interpreted, and the interpreted data is sent to a United States data center which transmits data to a United States meter payment data center that accumulates the United States postage payment for that meter and periodically sends the payments to the carrier's and/or post office bank. The United States meter data center also informs the United Kingdom meter data center of the future delivery of the previously metered mail to the United Kingdom along with a report of the amount of postage attributable to the Royal Mail, the unique identification that identifies the mail and notification that future business reply mail may be sent from the United Kingdom. When mail arrives in the United Kingdom, it is scanned so that the mail unique identification and amount of postage on the face of the mail will be interpreted and forwarded to the United Kingdom data center.

At the United Kingdom data center, the data will be stored and in turn forwarded to the Royal Mail meter payment data center, which notifies the Royal Mail to continue to deliver the mail to the recipient. The United Kingdom data center will inform the Royal Mail payment center that the mail is in the United Kingdom, and that it will receive funds from the United States meter payment data center. The Royal Mail data center also informs the United States data center of the delivery of the mail piece, providing confirmation to the original mailer (sender), and also "closes the loop" between the two international post offices and the sender/recipient. The Royal Mail meter payment center accumulates funds and periodically sends the funds to the Royal Mail bank.

When the recipient opens the mail and decides to return the enclosed business reply mail to the mailer (sender), the recipient deposits the business reply mail with the Royal Mail. The Royal Mail sorts and routes the business reply mail to the postal border exit office. At the postal border exit office, the business reply mail is scanned, and the payment data is extracted from the business reply mail and sent to the United Kingdom data center.

At the Royal Mail data center, the data will be stored and in turn forwarded to the United Kingdom meter payment data center, which notifies the Royal Mail to continue to process the business reply mail and to collect the postage indicated in the Royal Mail indicia affixed to the business reply mail. The Royal Mail data center will inform the Royal Mail payment center that the mail is leaving the United Kingdom, and that it will receive funds from the United States meter payment data center for the amount of postage indicated in the Royal Mail indicia affixed to the business reply mail. The Royal Mail data center also informs the United States data center of the delivery of the business reply mail, providing confirmation to the original mailer (sender), and also "closes the loop" between the two international post offices and the sender/recipient. The United Kingdom meter payment center accumulates funds and periodically sends the funds to the Royal Mail bank that it receives from the meter payment data center.

The business reply mail will be delivered to the United States where a postal entry scanner reads the USPS indicia on the business reply mail. The read data will be sent to the USPS meter data center. The USPS meter data center will receive and store the data and initiate the amount of payment indicated in the USPS postal indicia in the business reply mail to the United States meter payment data center, which in turn sends funds to the USPS bank. The business reply mail moves to the postal sorting and routing process and ultimately delivered to the original mailer. At the same time that the sortation process is happening, indicia data is being cancelled and forwarded to the original mailer as a status update of the incoming business reply mail.

An advantage of this invention is that it provides more accurate reporting and checking of the amount of international mail. Thus, each post office receives the correct revenue for the amount of mail that it processes.

DETAILED DESCRIPTION OF THE PREFERRED EMBODIMENT

Figure 1A:
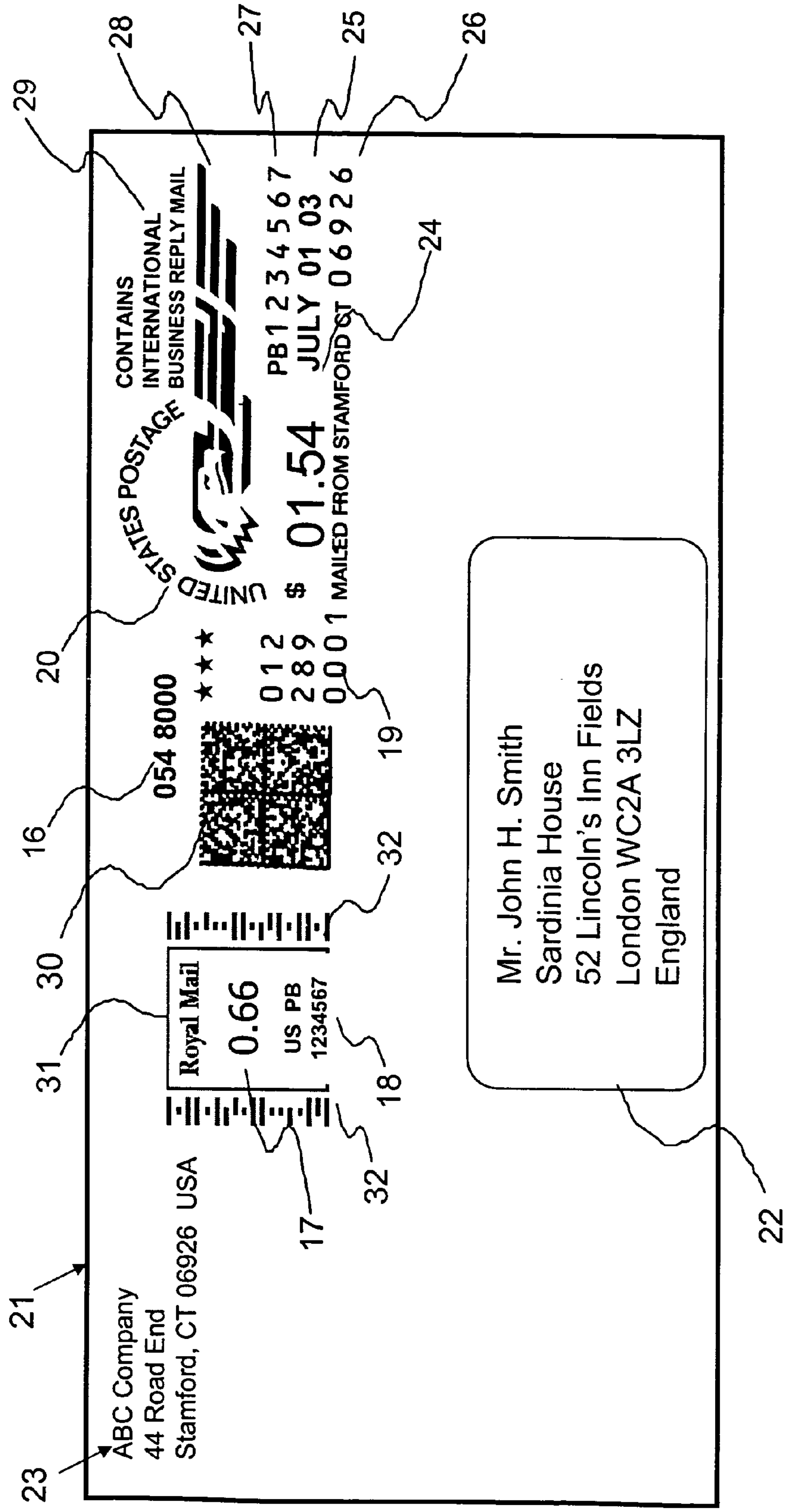
FIG. 1A is a drawing of international mail containing international business reply mail with a USPS postal indicia and a replica Royal Mail postal indicia affixed to the front of the mail.

Referring now to the drawings in detail, and more particularly to FIG. 1A, the reference character 21 represents mail, i.e., letter, flat, package, that has a recipient address field 22, a sender address field 23, USPS postal indicia 20, and Royal Mail postal indicia 31. Indicia 20 includes the price for United States postage 24, the date 25 that indicia 20 was affixed to mail 21, the place 26 from which mail 21 was mailed, a postage meter number 27, an eagle 28, an indication 29 that the mail piece 21 contains international business reply mail, a two-dimensional bar code 30, and a unique number 19. Royal Mail postal indicia 31 includes bar code 32, meter number 18, and the price of United Kingdom postage 17. Mail 21 may also include a number 16 that indicates the maximum number of authorized business reply mail that the mailer is willing to accept and the USPS will debit to the mailer's postage meter. For instance, number 16 may have two parts, the first of which number, 054, indicates the batch number and the second part, i.e., 8000, indicates the maximum number in the batch.

It would be obvious to one skilled in the art that mail 21 may not be sent to Mr. John Smith, and Mr. John Smith receives business reply mail 41 in a magazine or business reply mail 41 within a product.

Figure 1B:
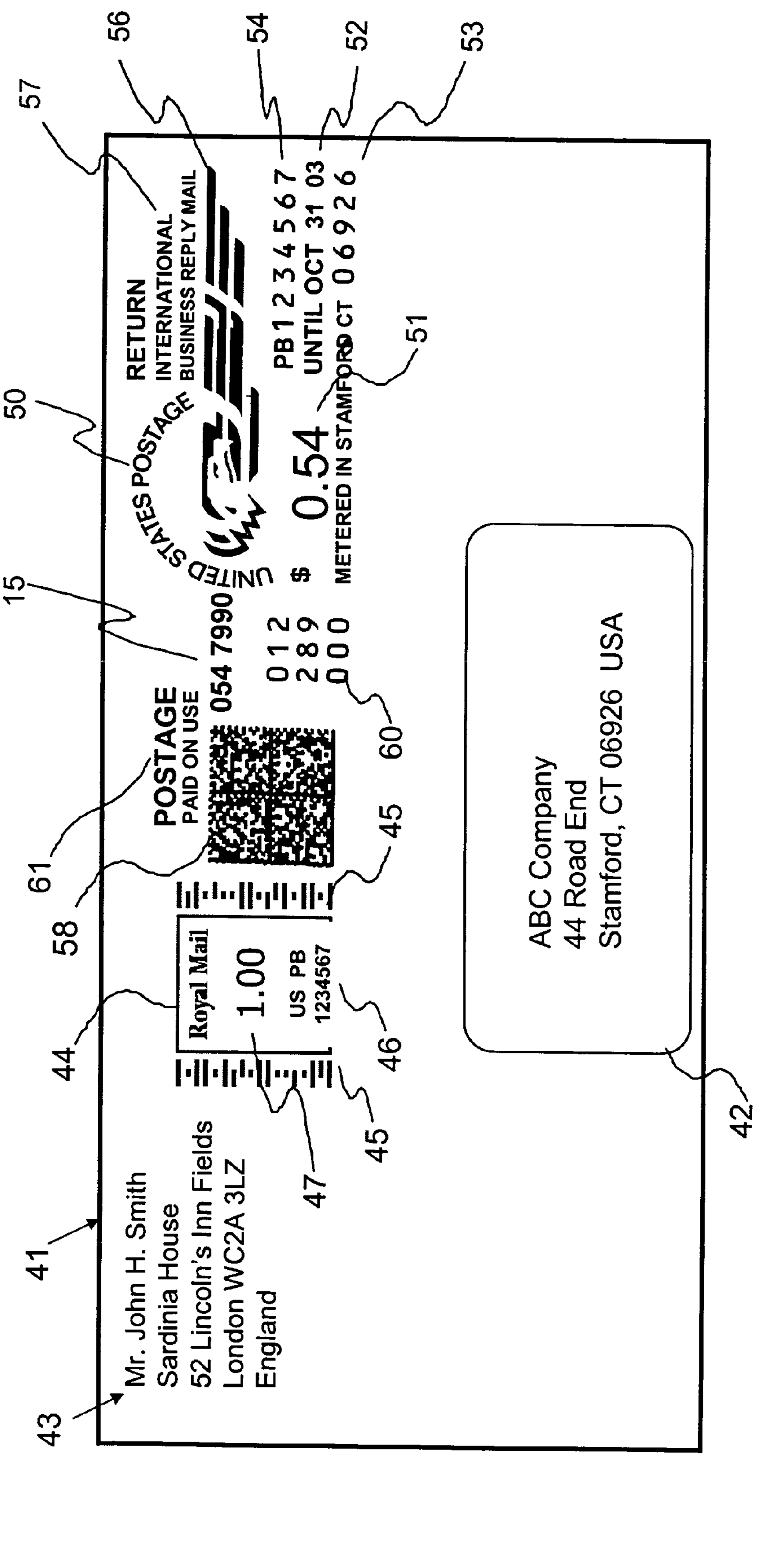
FIG. 1B is a drawing of international business reply mail containing a USPS post office postal indicia and a replica Royal Mail postal indicia affixed to the front of the business reply mail.

FIG. 1B is a drawing of international business reply mail containing a United States post office postal indicia and a replica Royal Mail postal indicia affixed to the front of the business reply mail. This type of mail is used for international mail that is deposited with the Royal Mail in the United Kingdom and delivered to a mailer in the United States who pays for the postage due the Royal Mail and the USPS with the mailer's postage meter when the business reply mail is scanned in the United Kingdom by the Royal Mail. Business reply mail 41 has a recipient address field 42, a sender address field 43, Royal Mail postal indicia 44, United States postal indicia 50 and unique identification code 60. Royal Mail postal indicia 44, includes bar code 45, meter number 46, the price of United Kingdom postage 47. United States postal indicia 50 includes the price for United States postage 51, the expiration date 52 that the mailer that owns the postage meter will pay for returned business reply mail the place 53 from which mail 41 was metered, a postage meter number 54, an eagle 56, an indication 57 that the mail piece 41 is return international business reply mail, a two-dimensional bar code 58 and an indication 61 that postage will be paid on use. Mail piece 41 may also include a number 15 that is an indexed count of the number of authorized business reply metered mail that the mailer is willing to accept, and the USPS will debit the mailer's postage meter account. For instance, number 15 has two parts, the first part of which number, 054, indicates the batch number, and the second part, 7990, indicates the indexed count in the batch.

It would be obvious to one skilled in the art that business reply mail 41 may be produced by interfacing PC meter 131 (FIG. 2) with a high-speed digital printer commonly used in the direct marketing printing industry.

Figure 2:
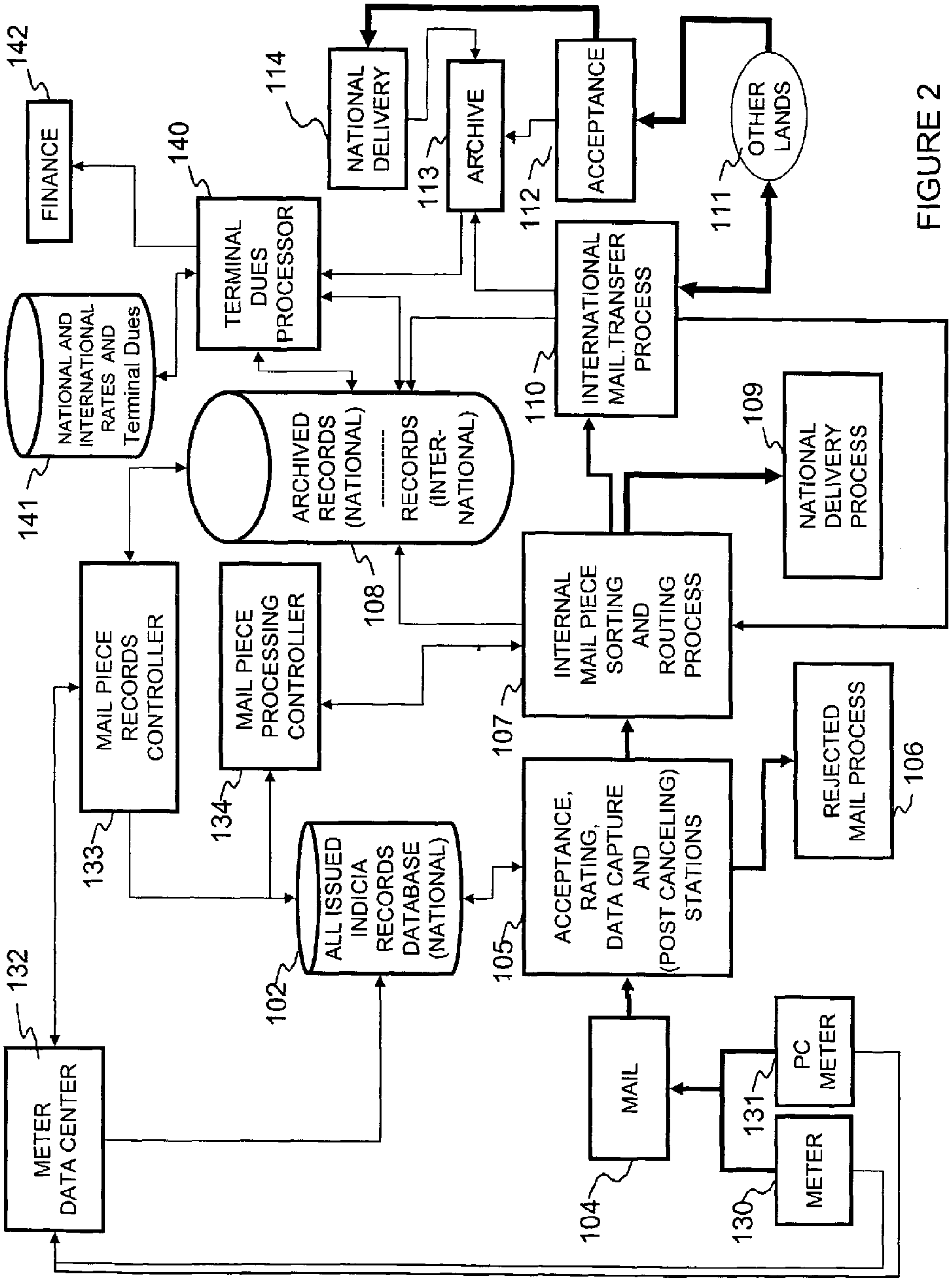
FIG. 2 is a block diagram illustrating the process of metering international mail so that terminal dues will be paid.

FIG. 2 is a block diagram illustrating the process of metering international mail so that terminal dues will be paid. Electronic postage meter 130 or personal computer meter 131 may be used to print indicia 20 and 31, bar codes 30 and 31 and unique number 18 (FIG. 1). During a communication between postage meter 130 or personal computer meter 131 with data center 132, it will be indicated that meter 130 or meter 131 printed indicia 20 and 31, bar codes 30 and 31 and unique number 18. Meters 130 and/or 131 will also transmit all of the information contained in indicators 20 and 40 to data center 132. Data center 132 will transmit the information contained in indicia 20 and 31, bar codes 30 and 31, and unique number 19 to mail records controller 133. The operation of meters 130 and 131 will be described in the description of FIG. 3. Mail records controller 133 will transmit the information it receives from data center 132 to data base 102, and mail piece processing controller where records are created, capturing the issued unique number 19 for a particular meter 130 or 131 account number. The record is a proof of validity of postal indicia 20 and 31 having an issued unique number 19 for a particular meter, and the proof is provided when data base 102 is consulted.

Postal terminal dues processor 140 is coupled to archive 108, national, international and terminal dues data base 141, finance 142, and archives 108 and 113. Processor 140 will poll archive 108 and archives 113 in other lands 111 (United Kingdom, France, German, Japan, etc.) and utilize data base 141 to determine the value of the mail processed by the receiving countries from the sending countries. Then processor 140 will determine how much money each country will receive for delivering mail 21. The amounts of money will be described in the description of FIG. 4. At agreed upon intervals, finance 142 will issue terminal dues statements to all participating countries and arrange for the transmission of funds to the countries' post offices.

In step 104, the mail is collected and rated at various post office recording stations using data capture techniques and processed by the accepting post office in step 105. As part of the mail accepting procedures in step 105, indicia 20 and 31, bar codes 30 and 31 and unique number 19 are examined and compared to data in data base 102 to determine whether the indicia 20 and 31, bar codes 30 and 31 and unique number 19 used are legitimate. When unique number 19 is issued for postal indicia 20 and 31, the issuance of unique number 18 is reported to the "all issued indicia records national data base" 102, where a record is created, capturing the issued unique number 19 for a particular mailer account number. The record is a proof of validity of postal indicia 20 and 31 having an issued unique number for a particular mailer account number, and the proof is provided when data base 102 is consulted.

In the acceptance process, a code reader is used to identify the unique number 18 and account number on indica 20 and 31. It is understood that, if any portion of indicia 20 and 31, bar codes 30 and 31 and unique number 18 is produced with an invisible ink, a special light source will be needed to make the indicia 20 and 31, bar codes 30 and 31 and unique number 18 visible to the code reader. The identified indicia 20 and 31, bar codes 30 and 31 and unique number 19 is reported to data base 102, and a proof of validity of indicia 20 and 31, bar codes 30 and 31 and unique number 18 is requested. If data base 102 has a record showing the issuance of the unique number 19 for the particular meter account serial number used and that the unique number 19 has not been canceled, then indicia 20 and 31 are considered legitimate. In that case, indicia 20 and 31 have passed the verification process, and the mail is accepted for further processing, with indicia 20 and 31 being canceled in step 105. It is preferred that the cancellation mark is produced with a visible ink in a manner that a "canceled" postal indicator is easily distinguishable from an unused one, and that a "cancelled" postal indicator" will still be able to be read.

When indicia 20 and 31 bearing a unique number 19 for a particular user meter account serial number are canceled in step 105, a request is made to data base 102 to alter the record that is specifically related to the unique number 19 being canceled. The altered record will contain the date and time of cancellation, the cost of the selected services derived from the weighing of the mail, and no longer provide a proof of validity when data base 102 is consulted. The cost for mailing the mail determined in step 105 will be charged to the mailer's meter 130 or 131. The mailer cost information will be transmitted to data center 132 via data base 102 and controller 133.

However, if the acceptance procedures in step 105 fail to yield a proof of validity of indicia 20 and 31, the mail will be sent to rejected mail process 106 where the mail will be returned to the sender or placed in the dead mail file.

The mail that step 105 determines has legitimate indicia 20 and 31 is sent to step 107 for internal sorting and routing from place to place. Step 107 will note the date and time the mail is at each step in the process. The foregoing information will be sent to archive 108 and mail processing controller 134. Then the physical mail is delivered nationally in step 109 or delivered internationally in step 110. Nationally, at the recipient's delivery post office, the mail will be scanned during the last sorting process where the date and time of sorting as well as other information identifying the mail, i.e., unique number 19, will be captured and stored in archive 108. At the last facility before the mail is transferred internationally in step 110, the mail will be scanned where the date and time of sorting as well as other information identifying the mail, i.e., unique number, will be captured and stored in archive 108.

At this point, the physical mail will be delivered to other lands 111. Then the mail will go to step 112 for sorting, routing and acceptance in the country in which the recipient is located. Step 112 will note the date and time the mail is at each step in the process. The foregoing information will be sent to archive 113. Then the physical mail is delivered nationally in step 114. At the international recipient's delivery post office, the mail will be scanned during the last sorting process where the date and time of sorting as well as other information identifying the mail, i.e., unique number, will be captured and stored in archive 113.

Figure 3:
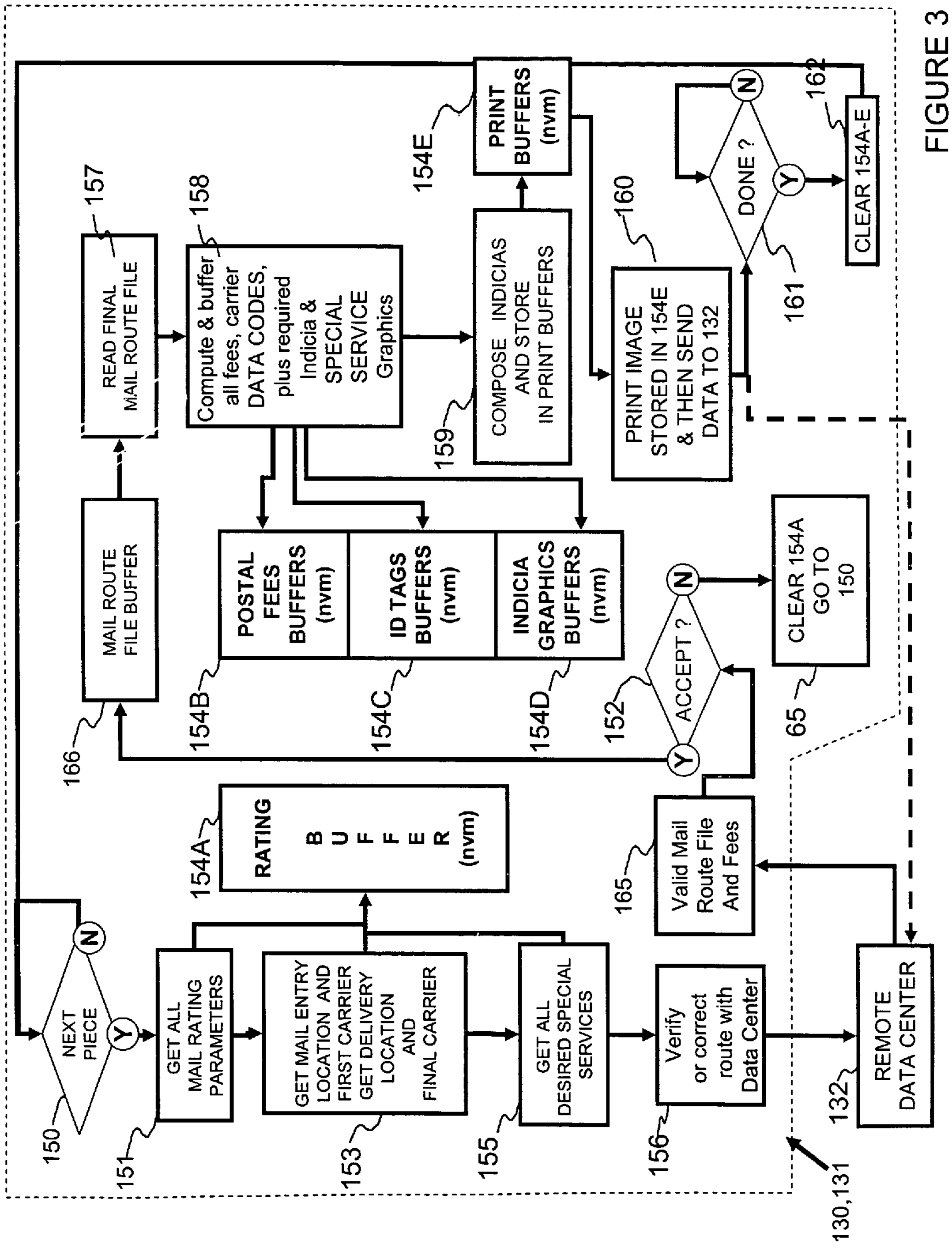
FIG. 3 is a block diagram of postage meter 130 or personal computer meter 131 of FIG. 2.

FIG. 3 is a block diagram of postage meter 130 or personal computer meter 131 of FIG. 2. The first step takes place at decision block 150. Decision block 150 determines whether or not the next mail is present. If block 150 determines that the next mail is not present, the program will go back to the input of block 150. If block 150 determines that the next mail is present, the next step will be step 151. Step 151 obtains all mail rating parameters, from the operator of meters 130 or 131 and/or another external source, i.e., how much does the mail weigh, the size of the mail, where is the mail going, what is the level of mail service, the contents of the mail, does the mail contain international business reply mail, etc., and places the mail rating parameters in buffer 154A. Next, in step 153, the delivery location of the mail and the final carrier are obtained from the operator of meters 130 or 131 and/or another external source and stored in buffer 154A. Then in step 155, all desired special services are obtained from the operator of meters 130 or 131. The data from step 155 is stored in buffer 154A. In step 156, the correct route and fees are verified with data center 132, i.e., the information obtained from buffer 154A is verified with remote data center 132.

Step 165 stores the valid mail route and fees file and any new bar codes and indicia graphics it receives from data center 132, and then transmits the valid mail route and fees file and indicia graphics to decision block 152. Decision block 152 determines whether the operator accepts the information from data center 132. If the operator does not accept the information, the program goes to block 65. Block 65 clears buffer 154A, and then the program goes back to block 150. If the operator accepts the information, the valid mail route file is transferred to buffer 166. Step 157 reads the valid mail route and fees file in buffer 166. Step 158 takes the valid mail route and fees file and computes and buffers all fees, carrier bar codes required indicia and special service graphics plus makes a note of the maximum number of business reply mail pieces that may be returned, i.e., number 16 (FIG. 1) and the expiration date 52 (FIG. 1B) with buffers 154B, 154C and 154D, i.e., the total fee for mail 21 (FIG. 1A) would be $2.20 with $0.66 payable to the Royal Mail, and $1.54 going to the United States Postal Service. It would be obvious to one skilled in the art that the payment to the Royal Mail may be made in United States Dollars or United Kingdom currency at the prevailing exchange rate. Step 159 composes the indicium in route, sequenced order and stores the above information in print buffer 154E. In step 160, the print images stored in buffer 154E are printed on mail 21C (FIG. 1A) and mail 41 (FIG. 1B), and then the image data field are sent to data center 132 to produce payment records. The next step is performed by decision block 161. Decision block 161 determines whether the image has been printed on mail 21 and mail 41, and whether the image data fields have been sent to data center 132. If the images have not been printed on mail 21 and 14, and the image data fields have not been sent to data center 132, the process will go back to the input of decision block 161. If the images have been printed on mail 21 and 41, and the image data fields have been sent to data center 132, buffers 154A-154E and 166 will be cleared in block 16, and the next step will be performed by decision block 150.

Figure 4:
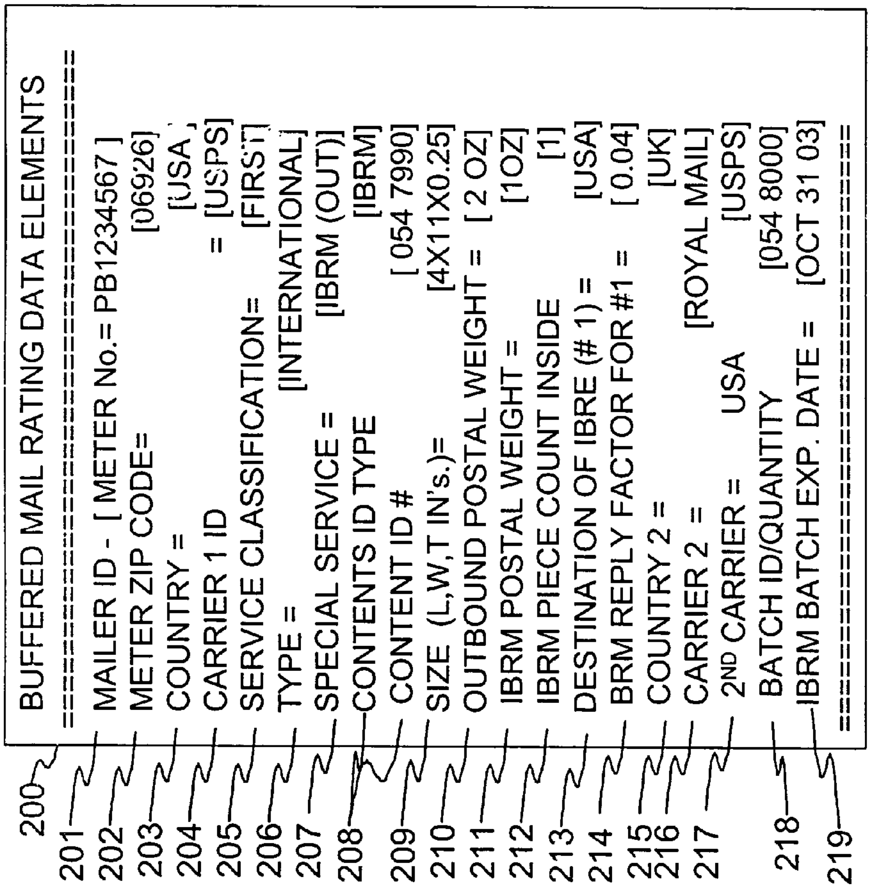
FIG. 4 is a drawing of the information stored in buffer 154A for mail 21 and mail 41.

FIG. 4 is a drawing of the information stored in buffer 154A (FIG. 3) as buffered mail rating data elements 200 for mail 21 and mail 41. Item 201 indicates the mailer's identification, i.e., the mailer's postage meter serial number PB 1234567. Item 202 indicates the zip code in which the meter is registered, namely, 06926. Item 203 indicates the code for the country of the first carrier, namely, the United States. Item 204 indicates the code for the first carrier, namely, the United States Postal Service. Item 205 indicates the service classification of the mail, namely, first class mail. Item 206 indicates the type of mail, for example, international mail. Item 207 indicates special services which is international business reply mail outbound. Item 208 indicates the contents of mail 21, namely, contains international business reply mail and the identification number of the contents of mail 21, i.e., the identification number of mail 41, i.e., 0542990. Item 209 indicates the size of the mail 21, namely, 4×11×0.25. Item 210 indicates the weight of mail 21, namely, 2 ounces. Item 211 indicates the weight of mail 41, namely, one ounce. Item 212 indicates the number of mail 41 inside mail 21, namely, 1. Item 213 indicates the destination of mail 41, namely, the United States. Item 214 indicates the expected business reply response factor for mail 41, namely, 4%. Item 215 indicates the second carrier country for mail 21, namely, the United Kingdom, and the first carrier country for mail 41, namely, the United Kingdom. Item 216 indicates the second country carrier for mail 21, namely, the Royal Mail, and the first carrier country for mail 21, namely, the United Kingdom. Item 217 indicates the second country and carrier for mail 41, namely, the United States and the USPS. Item 218 indicates the batch number and batch quantity for mail 41 that appears on mail 21, namely, 0548000. Item 219 indicates the expiration date for accepting mail 41.

Items 201-219 are transmitted to remote data center 132 where they are processed. Data center 132 returns a validated mail route file complete with computed postal fees which are stored in buffer 166.

Figure 5:
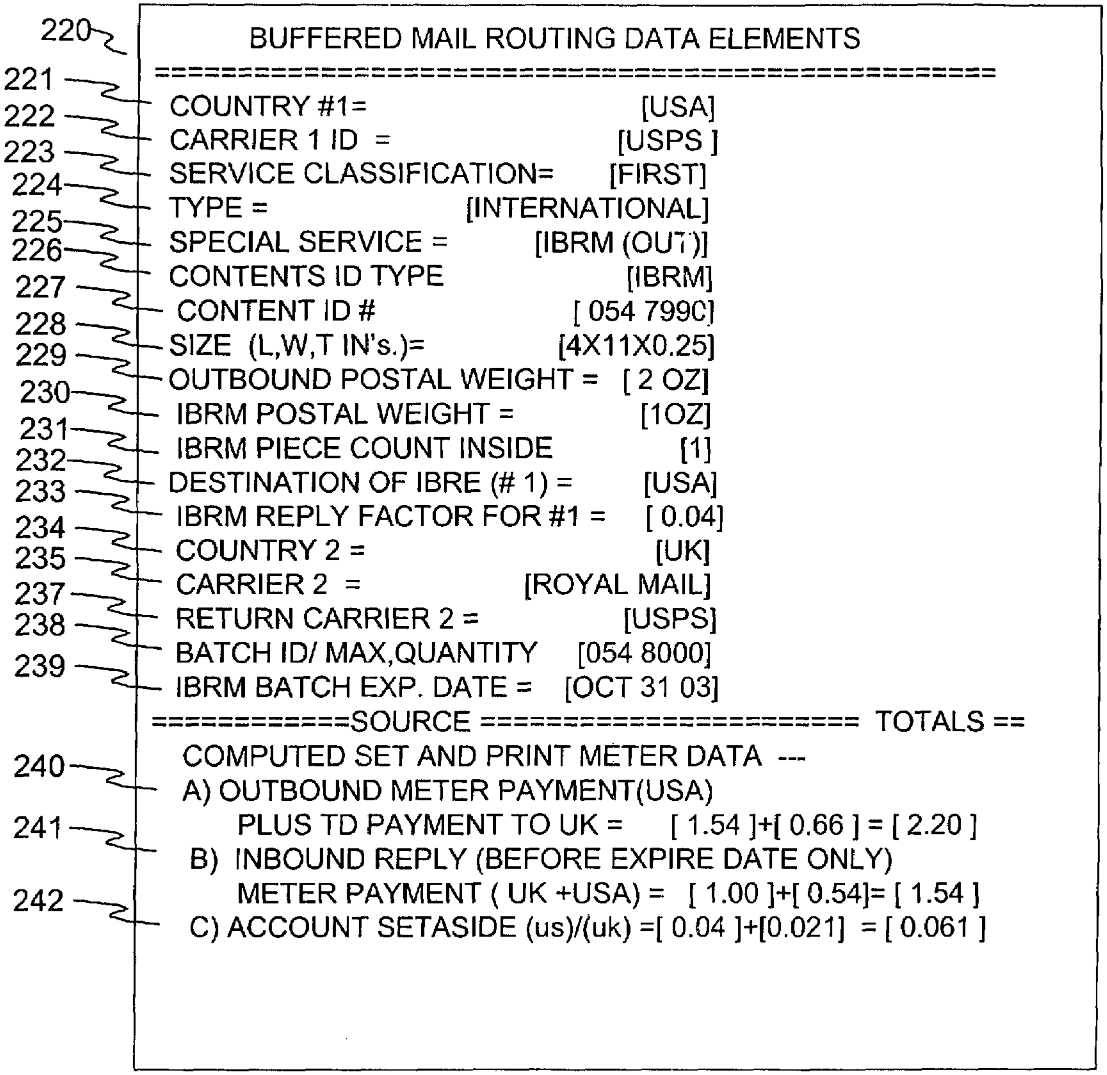
FIG. 5 is a drawing of the information stored in buffer 166 for mail 21 and 41.

FIG. 5 is a drawing of the information stored in buffer 166 as buffered mail route data elements 220 for mail 21 and mail 41. Item 221 indicates the mailer's identification, i.e., the mailer's postage meter serial number PB 1234567. Item 222 indicates the zip code in which the meter is registered, namely, 06926. Item 223 indicates the code for the country of the first carrier, namely, the United States. Item 224 indicates the code for the first carrier, namely, the United States Postal Service. Item 225 indicates the service classification of the mail, namely, first class mail. Item 226 indicates the type of mail, for example, international mail. Item 227 indicates special services which is international business reply mail outbound. Item 228 indicates the contents of mail 21, namely, contains international business reply mail and the identification number of the contents of mail 21, i.e., the identification number of mail 41, i.e., 0547990. Item 229 indicates the size of the mail 21, namely, 4×11×0.25. Item 230 indicates the weight of mail 21, namely, 2 ounces. Item 231 indicates the weight of mail 41, namely, one ounce. Item 212 indicates the number of mail 41 inside mail 21, namely 1. Item 232 indicates the destination of mail 41, namely, the United States. Item 233 indicates the expected business reply response factor for mail 41, namely, 4%. Item 234 indicates the second carrier country for mail 21, namely, the United Kingdom and the first carrier country for mail 41, namely, the United Kingdom. Item 235 indicates the second country carrier for mail 21, namely, the Royal Mail. Item 237 indicates the second country and carrier for mail 41, namely, the United States and the USPS. Item 238 indicates the batch number and batch quantity for mail 41 that appears on mail 21, namely, 054 8000. Item 239 indicates the expiration date for accepting mail 41. Item 240 indicates the outbound meter payment plus the terminal dues payment to the United States Postal Service for mail 21, namely, $1.54, plus the terminal dues payment to the Royal Mail of $0.66 for a total payment of $2.20. Item 241 indicates the inbound reply mail meter payment to Royal Mail and the USPS, i.e., $1.00 plus $0.54 for a total of $1.54. Item 242 indicates the computed account set aside for the USPS and Royal Mail, i.e., $0.04 and $0.021 for a total of $0.061.

Figure 6:
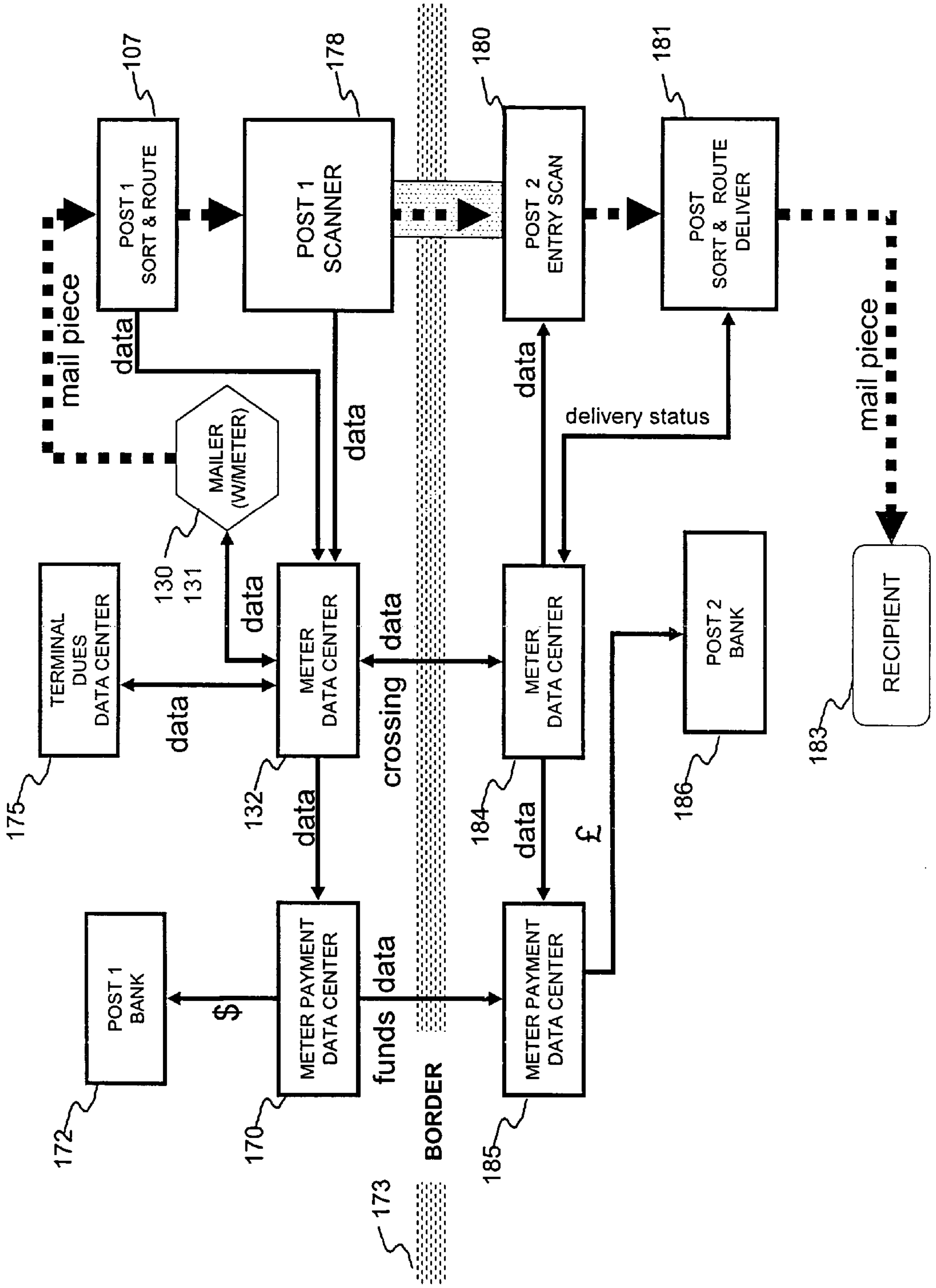
FIG. 6 is a block diagram illustrating the process of the payment of terminal dues for mail piece 21.

FIG. 6 is a block diagram illustrating the process of the payment of terminal dues for mail 21 (FIG. 1A). When mail is mailed in the United States and delivered to a destination in the United Kingdom, the mailer's postage meter 130, 131 will place a United States Postal Indicia 20 (FIG. 1A) on mail 21 for that portion of the delivery cost that is attributable to the United States post office and a Royal Mail postal indicia 31 (FIG. 1A) on the mail 21 for that portion of the delivery cost that is attributable to the Royal Mail. Meter 130, 131 will also notify remote data center 132 that is located in the United States that the mail has been metered for the correct international mail values for mail being deposited in the United States and delivered in the United Kingdom. Mail 21 will be sorted and routed by the United States Postal Service in block 107. As the mail approaches the United States border 173, the face of mail 21 is scanned and interpreted by carrier scanner 178, and the interpreted data is sent to a United States remote data center 132 which transmits data to a United States meter payment data center 170 that accumulates the United States postage payment for that meter and periodically sends the payments to the United States post office bank 172. The United States remote meter data center 132 also informs the United Kingdom meter data center 184 of the future delivery of the previously metered mail 21 to the United Kingdom along with a report of the amount of postage attributable to the Royal Mail and the unique identification number or code 19 (FIG. 1A), that identifies the mail. When mail arrives in the United Kingdom, it is scanned at Royal Mail entry scan 180 so that the mail unique identification number or code 19 and amount of postage on the face of the mail will be interpreted and forwarded to the United Kingdom meter data center 184. At the United Kingdom data center 184 the data will be stored and in turn forwarded to the Royal Mail meter payment data center 185, which notifies the Royal Mail 181 to continue to deliver the mail to the recipient 183. At the same time, the Royal Mail data center 184 notifies the United States Postal Service meter data center 132 of the confirmation of delivery of the mail, and the United States Postal Service meter data center 132 can provide mail tracking information to the original sender. The United Kingdom data center 184 will inform the Royal Mail Payment center 185 that the mail is in the United Kingdom, and that it will receive funds from the United States meter payment data center 170. The United Kingdom meter payment center 185 accumulates funds and periodically sends the funds to the Royal Mail bank 186.

Figure 7:
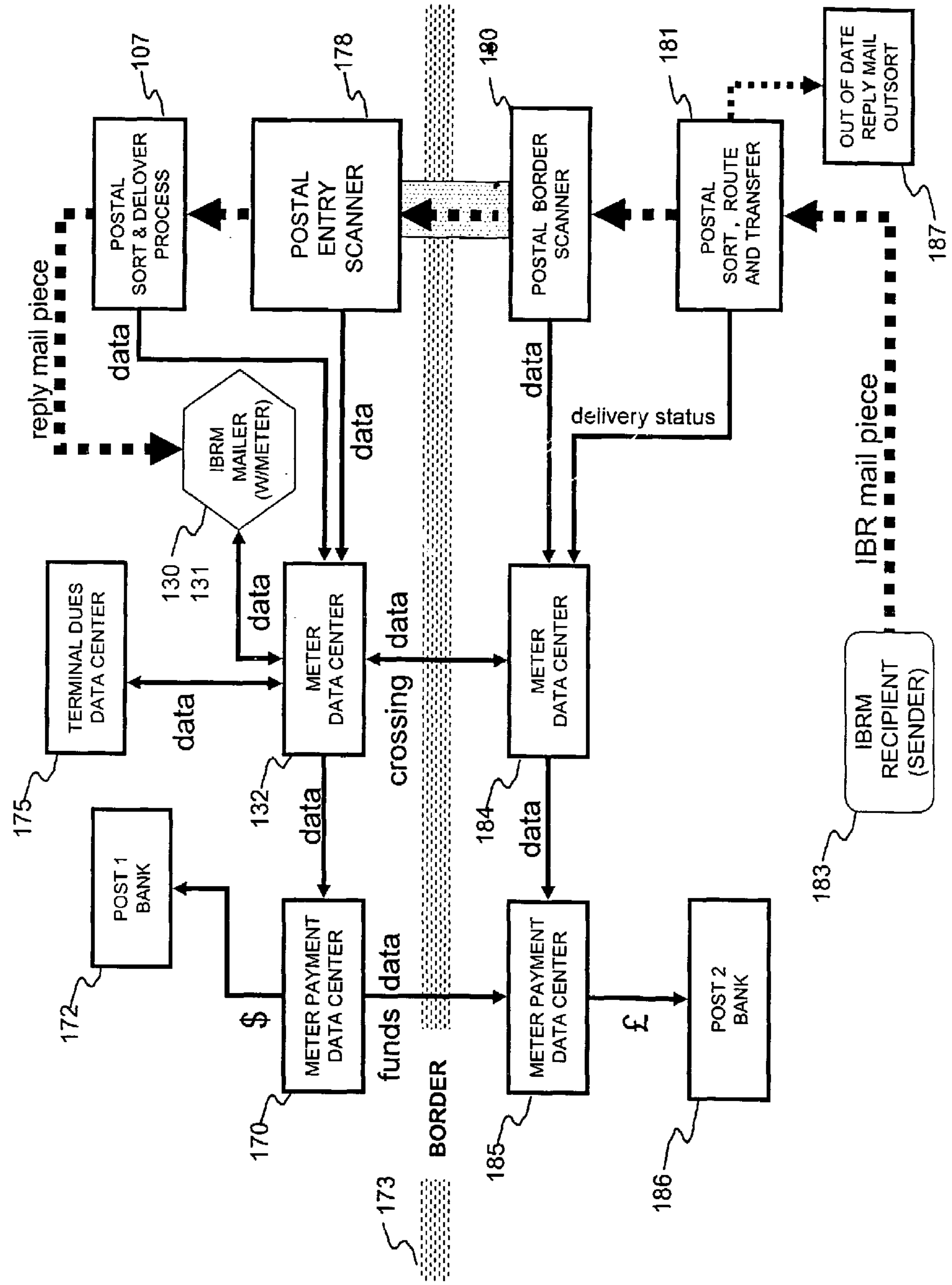
FIG. 7 is a block diagram illustrating the process of the payment of terminal dues for mail piece 41.

FIG. 7 is a block diagram illustrating the process of the payment of terminal dues for mail 41. When mail 41 is mailed in the United Kingdom and delivered to a destination in the United States, the mailer's postage meter 130, 131 will have previously placed a United Kingdom Postal Indicia 44 (FIG. 1B) on mail 41 for that portion of the delivery cost that is attributable to the United Kingdom post office, i.e. $1.00, and a United States postal indicia 50 (FIG. 1B) on the mail 41 for that portion of the delivery cost that is attributable to the USPS, i.e., $0.54. There will also appear on mail 41 a number 15 that is an indexed count of the number of authorized business reply mail that the mailer is willing to accept and the expiration date 52 (Oct. 31, 2003) that the mailer who owns the postage meter 130, 131 will pay for the returned international business reply mail. The mailer's postage meter 130, 131 may have reported an expected business reply response factor for mail 41, i.e. 4%, of the number 16 (FIG. 1A). It would be obvious to one skilled in the art that the expected business reply response factor may be any number greater than 0% and equal to or less than 100%. Thus, for batch 054 the Royal Mail and the USPS may expect to process (8000) (0.04)=320 mail 41 by Oct. 31, 2003. Thus, meter 130, 131 may be charged a set aside of ($1.54) (320)=$492.80 for the expected mailing of mail 41. Meter 130, 131 will also notify remote data center 132 that is located in the United States that mail 41 has been metered for the correct international mail values for international business reply mail being deposited in the United Kingdom and delivered in the United States and that meter 130, 131 has been debited for the calculated set aside of $492.80. Postage meter 130, 131 will receive a credit if less than 320 mail 41 is processed on or before Oct. 31, 2003 and postage meter 130, 131 may be charged additional funds for the processing of 8,000–320=7,680 mail 41 on or before Oct. 31, 2003.

Mail 41 will be sorted, routed and transferred by the Royal Mail in 181, and the delivery status of mail 41 will be sent to United Kingdom data center 184. Any mail 41 that has an expiration date 52 that is after Oct. 31, 2003, will be outsorted in block 187. Mail 41 that is not outsorted will be sent to Royal Mail postal border scanner 180 where mail 41 will be scanned. Scanner 180 will read the unique identification number 60 and the amount of postage on the face of mail 41 so that number 60 and the amount of postage will be interpreted and forwarded to United Kingdom Data Center 184. At the same time, the United Kingdom Data Center 184 notifies the USPS meter data center 132 that mail 41 is arriving. As mail 41 approaches the United States border 173, the face of mail 41 is scanned and interpreted by postal entry scanner 178, and the interpreted data is sent to United States Postal Service meter data center 132, which transmits data to USPS meter payment data center 170 and United Kingdom Data Center 184. Data Center 184 transmits this data to United Kingdom meter payment data center 185. Mail 41 will be processed by the postal sort and deliver process 107 and delivered to the owner of meter 130, 131. Data Center 132 will inform meter 130, 131 that mail 41 has been processed. United States data center 132 will maintain the accuracy of the terminal dues rates by accessing terminal dues data center 175. Data center 170 accumulates the United States postage payment for that meter and periodically sends the payments to the USPS bank 172. The United States meter payment data center 170 also informs the United Kingdom of the delivery of mail 41 to the United States along with a report of the amount of postage attributable to the Royal Mail and the unique identification number or code 60 (FIG. 1B) that identifies the mail. Data Center 170 also periodically sends funds to United Kingdom meter payment data center 185. Data center 185 accumulates the funds and periodically sends the funds to Royal Mail bank 186.

The above specification describes a new and improved method for paying for international business reply mail. It is realized that the above description may indicate to those skilled in the art additional ways in which the principles of this invention may be used without departing from the spirit. Therefore, it is intended that this invention be limited only by the scope of the appended claims.

What is claimed is:

1. A method for paying for international business reply mail that is processed by a second carrier located in a second country and a first carrier located in a first country, comprising the steps of:

placing a first number on the business reply mail that indicates a batch number of the business reply mail;

placing a second number on the business reply mail that indicates a maximum number of authorized business reply mail that will be charged to a sender's meter located in the first country, wherein the maximum number is less than a total number of the business reply mail mailed;

charging the sender's meter located in the first country for postage for the authorized maximum number of business reply mail that is due to the second carrier for processing the business reply mail that is deposited by a recipient with the second carrier based upon the first and second numbers scanned by the second carrier;

charging a sender's meter located in the first country for postage that is due to the first carrier for the business reply mail that is received from the second carrier based upon the first and second numbers scanned by the first carrier and delivered to a party located in the first country;

paying the first carder the amount charged to the sender's meter for the first carrier's postage; and paying the second carrier the amount charged to the sender's meter for the second carrier's postage.

2. The method claimed in claim 1, wherein the party is the sender.

3. The method claimed in claim 1, further including the step of:

printing on the business reply mail an indication of the amount of postage charged to the sender's meter for the first carrier's postage; and printing on the business reply mail an indication of the amount of postage charged to the sender's meter for the second carrier's postage.

4. The method claimed in claim 1, further including the step of:

delivering an item containing the business reply mail from the sender located in the first country to the recipient located in the second country.

5. The method claimed in claim 4, further including the step of:

charging the sender's meter for delivering the item.

6. The method claimed in claim 5, further including the steps of:

printing on the item an indication of the amount of postage charged to the sender's meter for the first carrier's postage; and printing on the item an indication of the amount of postage charged to the sender's meter for the second carrier's postage.

7. The method claimed in claim 4, further including the steps of:

paying the first carrier the amount charged to the sender's meter for delivering the item; and paying the second carrier the amount charged to the sender's meter for delivering the item.

8. The method claimed in claim 4, further including the step of:

indicating on the item an amount of business reply mail that may be returned to the sender.

9. The method claimed in claim 8, further including the step of:

determining an expected business reply response factor for the business reply mailing.

10. The method claimed in claim 9, further including the step of:

determining a cost of mailing the expected business reply responses.

11. The method claimed in claim 10, further including the step of:

charging the sender's meter for the cost of mailing the expected business reply responses.

12. The method claimed in claim 11, further including the step of:

counting the number of business reply mail processed by the first and second carriers.

13. The method claimed in claim 12, further including the step of:

determining a total amount of postage due to the first and second carriers for processing the counted business reply mail.

14. The method claimed in claim 4, further including the step of:

indicating on the business reply mail an expiration date that the sender's meter will be charged for processing specific batches of business reply mail.

15. The method claimed in claim 1, wherein the sender's meter is a postage meter.

16. The method claimed in claim 1, further including the steps of:

printing a first country indicia on the business reply mail to indicate the amount of postage due to the first carrier; and printing a second country indicia on the business reply mail to indicate the amount of postage due to the second carrier.

* * * * *